United States Patent [19]
Clark et al.

[11] 3,839,248
[45] Oct. 1, 1974

[54] PLIABLE SEALANT MATERIALS IN STRIP OR RIBBON FORM

[75] Inventors: Peter Stanley Clark; Paul Victor Jones, both of Chur, Switzerland

[73] Assignee: Foseco Trading A.G., Chur, Switzerland

[22] Filed: Apr. 5, 1971

[21] Appl. No.: 131,520

[30] Foreign Application Priority Data
Apr. 6, 1970 Great Britain.................... 16132/70
Feb. 5, 1971 Great Britain...................... 4052/71

[52] U.S. Cl............. 260/19 R, 260/22 R, 106/251, 106/253, 106/260
[51] Int. Cl................................................ C08g 5/20
[58] Field of Search ........... 106/253, 244, 251, 248, 106/260, 263; 260/22 R; 264/211

[56] References Cited
UNITED STATES PATENTS

| | | | |
|---|---|---|---|
| 1,838,658 | 12/1931 | Chapin............................... | 106/251 |
| 1,910,641 | 5/1933 | Seliger.................... | 106/266 |
| 2,422,356 | 6/1947 | Lasher............... | 260/22 R |
| 2,864,882 | 12/1958 | Snell........................... | 260/33.6 AQ |
| 3,402,237 | 9/1968 | Holzinger....................... | 106/253 X |

FOREIGN PATENTS OR APPLICATIONS
738,974 10/1955 Great Britain..................... 106/244

OTHER PUBLICATIONS

Condensed Chemical Dictionary; Reinhold Pub. Corp.; 1966; pages 162, 201, 1019; Sci. Lib. QD 5 C5.

Skeist; Handbook of Adhesives, Van Nostrand Reinhold Co.; 1962; pages 564–566; Sci. Lib. TP 968.S5 C.6.

*Primary Examiner*—Lewis T. Jacobs
*Attorney, Agent, or Firm*—Wolfe, Hubbard, Leydig, Voit and Osann

[57] ABSTRACT

Sealants in strip or ribbon form consisting of finely divided particulate filler such as calcium carbonate, fibrous material such as fiberized newsprint or asbestos and a liquid vehicle such as alkyd resins, having hardness penetration values in certain ranges at particular temperatures which remain pliable and adequately soft over long periods of time.

4 Claims, No Drawings

PLIABLE SEALANT MATERIALS IN STRIP OR RIBBON FORM

This invention relates to sealant materials.

In many industries there is a constant growing demand for sealants which will act efficiently in the conditions of use but will not suffer from the disadvantages of many present day sealants. Classical sealants such as tars, pitches, bitumen and putty are generally messy to use, and have, either throughout their life or after a short while, undesirable mechanical properties. In recent years, various polymeric materials, for example polysulphides and polysulphones have been developed as sealants, but these materials, while advantageous in many ways, are very costly and in some cases, difficult to handle and use.

According to the present invention there is provided a sealant composition in strip or ribbon form comprising a finely divided particulate filler, fibrous materials, and a liquid vehicle, the said vehicle comprising an alkyd resin or a non drying oil or a blend of a drying oil plus adjuvants to prevent oxidation thereof, the sealant having a penetration value of not greater than 70 penetration units at −10°C, a penetration value of not less than 35 penetration units at 30°C, a storage ability such that after three months exposure at 30°C in air at 50 percent relative humidity, the penetration is not less than 35 penetration units at −10°C, and a hardness of not greater than 120 penetration units under normal pressure but irrespective of time and temperature. Penetration units as used herein are those obtained by the use of a 102.5 gm steel tipped cone and a 47.5 gm plunger according to ASTM D 937-1P 179 and ASTM D.217-1P50. One unit of penetration is 0.1 mm in the test conditions laid down in those test specifications.

Preferably, the components of the sealant are present in the following proportions by weight:

filler 40 – 80 percent most preferably 40 – 70 percent fibre 1 – 30 percent most preferably 3 – 25 percent vehicle 5 – 50 percent most preferably 10 – 40 percent Two particular families of sealants have weight proportions of filler/fibre/vehicle in the following ranges of weight percentage respectively: 40–70: 3–20: 10–35 and 40–80: 3–25: 15–40.

The finely divided particulate filler may be, for example, calcium carbonate, precipitated chalk, Paris white, fine whiting or talc. Preferably at least 90 percent by weight of the filler is of particle size less than 0.05 mm. The particles of the filler may be coated, for example with a resin or with a stearate, in order to prevent absorption into the filler of large quantities of the non-drying liquid vehicle.

The fibrous material may be organic or inorganic or a mixture of the two. Preferred organic fibres for use in the sealant of the present invention include fiberised newsprint, wood fibre, carbonized rayon and carbonized kraft paper fibres. Preferred inorganic fibres include asbestos, of amosite or chrysotile type, fibrous asbestine talc, glass wool and slag wool. The fibre length is preferably in the range of 0.01 – 0.05 mm, and the diameter of the fibres is preferably in the range of 180 to 400 Angstroms.

The vehicle must be a liquid material which, on being exposed to the normal oxygen containing atmosphere at conditions of standard temperature and pressure, will not harden within 3 months. This generally ensures that an extruded ribbon, strip or rope of sealant remains pliable and "adequately soft" during storage over a period of three months at least, at ambient U.K. temperatures i.e. from −10°C to 30°C, i.e., the sealant does not appreciably harden or embrittle during this storage period.

"Adequately soft" as used herein is defined by the depth of penetration of a hardened steel tip, supported on a brass cone, and applied by a standard penetrometer.

If the depth of penetration of a standard hardened steel tipped cone (102.5 gms) and the plunger (47.5 gms) complying with A.S.T.M. D 937-I.P.179 and A.S.T.M. D.217-I.P.50, applied for 5 seconds, is within the range 35–50 units of penetration (1 unit of penetration is 0.10 mm) at room temperatures, then the sealant is "adequately soft."

The vehicle may be a pure liquid, a mixture of liquids, or a liquid having a material dissolved in it to prevent hardening. Alkyd resins and non-drying oils are a preferred class of liquid vehicles, but also of value are drying oils (e.g. linseed oil, stand oil, castor oil), having antioxidants dissolved or dispersed therein (e.g. methyl ethyl ketoxime or hydroquinone).

The proportions of the ingredients for any particular sealant should, of course, be selected to give a sealant of the desired consistency and hardness.

It is also desirable so to select the proportions that an extruded ribbon or rope of sealant will not soften appreciably during heating from room temperature to 250°C when in contact with a heated cast iron block.

Using the standard penetrometer test mentioned above, the sealant should preferably only soften from e.g., 45 units of penetration to 100 units of penetration if the temperature is raised from ambient to 250°C over a period of 30 minutes. A particularly preferred class of sealants consists of those which, if held at constant temperature of 150°C will not soften to more than 65 penetrometer units in 5 minutes, and thereafter will rapidly and progressively harden to 60 units or less with further time, due to chemical change of components in the sealant composition.

The thermal decomposition temperature of the sealant is preferably greater than 250°C; between 250°–300°C such a material will slowly start to carbonise.

The following examples will serve to illustrate this invention. All the sealants of the examples are of particular value as materials for use as the soft layer described in copending U.S. application No. 69,462, filed Sept. 3, 1970, and now U.S. Pat. Ser. No. 3,749,628, issued July 31, 1973. In these examples the following materials, inter alia, were used.

Fillers

1. Paris White, Fine Whiting.
    White amorphous powder of naturally occurring calcium carbonate.
2. Precipitated chalk.
    a. Uncoated precipitated chalks of bulk density 0.32 – 0.98 gms/ml. ranging from particle size 10 microns to greater than 16 microns.

b. Light precipitated chalks of bulk density 0.21 gms/ml, coated with 1 percent wood resin or 3 percent of stearate c. Light precipitated chalks of bulk density 0.30 – 0.4 gms/ml. calcitic crystal structure, uncoated.

Particle size in the range 3–10 microns, oil absorption 30–60 gms. of oil per 100 gms of precipitated chalk.

Fibres:

1. Short fibre chrysotile asbestos
2. Asbestine fibre
   Coarse fibrous talc, 90 percent less than 325 mesh, and of average particle size 11 microns.
3. Crude amosite asbestos, medium to short fibre length.

Liquid Vehicles:

1. 5 parts by weight 850 poises linseed stand oil with 1 part by weight olive oil, to give a product of final viscosity 310 poises at 25°C.
2. 6 parts by weight 550 poises linseed stand oil blended with 1 part by weight olive oil to give a product of final viscosity 300 poises at 25°C.
3. Linseed stand oil with 0.25 percent anti-oxidant to give a final viscosity of 292 poises at 25°C.
4. Linseed stand oil with 0.50 percent anti-oxidant to give a final viscosity of 292 poises at 25°C.
5. 5 parts by weight of 850 poises linseed stand oil blended with 1 part by weight olive oil to give a final viscosity of 310 poises at 25°C, but with 0.05 – 0.50 percent anti-oxidant added.
6. A non-drying alkyd type resin based on castor azoleic acid with an acid value of 10. Viscosity 1040 poises at 25°C, resin is solvent free.
7. A non-drying alkyd type resin based on castor adipic acid, with an acid value of 7. Viscosity 1140 poises at 25°C, resin is solvent free.
8. A non-drying alkyd resin, castor oil type, based on Sebacic Acid, 100 percent non-volatile.
9. A non-drying alkyd resin, viscosity 350–500 poise at 20°C.
10. Alkyd resin - pure drying oil, modified, i.e. - linseed D.C.O. (Distilled Castor Oil), viscosity 100 poise at 20°C.
11. A non-drying alkyd resin based on sebacic acid.
12. Blend of 80 percent 90 poise stand oil with 20 percent xylenol phenolic resin to give a final viscosity of 400 poises at 25°C.
13. Blended drying or non-drying oils modified with synthetic or natural resins.
14. Linseed stand oil 250–500 poise at 25°C with 0.1 – 0.5 percent hydroquinone anti-oxidant.
15. Blend of linseed stand oil with soyabean stand oil in a ratio 3 linseed to 1 soyabean oil (by wt.) to give a final blended viscosity of 300–350 poise at 25°C.

(Soyabean stand oil is a partially drying oil, which slightly retards the gelation of the linseed oil at room temperature, but increases the rate of hardening of the linseed oil at elevated temperatures).

Sealants according to this invention may be made simply by mixing the ingredients together by an appropriate method. Generally, it is preferable first to mix the dry ingredients in a two-blade mixer incorporator, and then to mix in the liquid vehicle. Care must be taken not to over-mix the ingredients, or degradation will set in and the sealant will become too soft (penetration values too high). Generally, only sufficient mixing to render the mixture substantially homogeneous is required.

In all the following examples, percentages are by weight.

| EXAMPLES 1 and 2 | | |
|---|---|---|
| General type: | | |
| Whiting | | 40 – 70% |
| fibres (No. 1 above) | | 5 – 25% |
| Vehicle (No. 6 or 7 above) | | 15 – 30% |
| Specific recipes: | | |
| Example 1 | Whiting | 50% |
| | fibre (type 1) | 25% |
| | Non-drying alkyd (type 6) | 25% |
| | Penetration 43 units at 18°C | |
| Example 2 | Whiting | 59.6% |
| | fibre (type 1) | 17.0% |
| | Non-drying alkyd (type 7) | 23.4% |
| | Penetration 72 units at 18°C | |

| EXAMPLES 3 – 5 | | |
|---|---|---|
| General type: | | |
| Whiting | | 40 – 70% |
| fibres (No. 1 above) | | 5 – 25% |
| fibres (No. 2 above) | | 0 – 25% |
| Vehicle (No. 1–5 above) | | 15 – 30% |
| Specific recipes: | | |
| Example 3 | Whiting | 59.6% |
| | fibre (type 1) | 17.0% |
| | Oil blend as given under types 1–5 | 23.4% |
| | Penetration 50 units at 18°C | |
| Example 5 | Whiting | 59.5% |
| | Fibre (type 1) | 12.0% |
| | fibre (type 2) | 5.1% |
| | Oil blend as given under type 3 | 23.4% |
| | Penetration 40 units at 18°C. | |

| EXAMPLES 6 and 7 | | |
|---|---|---|
| General type: | | |
| precipitated chalk | | 30 – 70% |
| fibres (No. 1,2, or 3 above) | | 2.5 – 25% |
| vehicle (Nos. 1–7 above) | | 15 – 50% |
| Specific recipes: | | |
| Example 6 | Precipitated chalk, light weight stearate coated (type 6) | 50.5% |
| | fibre (type 1) | 5.9% |
| | Oil blend types 1–5 or castor alkyd types 6–7 | 43.6% |
| | Penetration 68 units at 18°C. | |
| Example 7 | Precipitated chalk, light weight stearate coated | 60.0% |
| | Crude amosite, short fibres | 7.0% |
| | Oil blend types 1–5 or castor alkyds 6–7 | 33.0% |
| | Penetration 73 units at 18°C. | |

| EXAMPLES 8–14 | |
|---|---|
| General type: | |
| precipitated chalk or whiting | 40 – 70% |
| Fibres (No. 1 or 3 above, or caulking grade chrysotile asbestos) | 1.5 – 12% |
| Vehicles (Nos. 8–15 above) | 15 – 40% |

EXAMPLES 8–14 -Continued

Specific recipes:

Example 8
| | |
|---|---|
| Precipitated chalk, light weight, coated | 60.0% |
| Amosite, short fibre (type 3) | 7% |
| Vehicle (type 8) | 33.0% |

Penetration 90 units after 2½ hours at 100°C.

Example 9
| | |
|---|---|
| Precipitated chalk, light weight stearate coated | 66.0% |
| Amosite, short fibre (type 3) | 7.7% |
| Liquid vehicle (type 9) | 26.3% |

Penetration 96 units after 3 hours at 100°C.

Example 10
| | |
|---|---|
| Whiting | 60.2% |
| Asbestos (type 1) | 17.1% |
| alkyd resin (type 10) | 22.7% |

Penetration 84 units after 2 hours at 150°C.

Example 11
| | |
|---|---|
| Precipitated chalk, light weight stearate coated | 60.0% |
| Amosite, short fibre | 7.0% |
| non-drying alkyd (type 11) | 33.0% |

Penetration 60 units after 1 hour at 65°C.

Example 12
| | |
|---|---|
| Whiting | 58.4% |
| Asbestos (type 1) | 16.6% |
| Vehicle No. 13 | 25.0% |

Penetration 60 units at 18°C.

Example 13
| | |
|---|---|
| Whiting | 51.00% |
| Precipitated chalk (type 2c) | 10.10% |
| Asbestos — short fibre caulking grade chrysotile | 13.80% |
| Disintegrated Kraft Paper (−5/16″ + ⅜″) | 1.00% |
| Blend of stand linseed oil with stand soyabean oil to give final viscosity of 350 poise at 25°C | 24.00% |
| Anti-oxidant (hydroquinone) | 0.10% |

Penetration 70 units after 100 minutes at 150°C.

Example 14
| | |
|---|---|
| Whiting | 49.3% |
| Precipitated chalk (type 2c) | 9.9% |
| Asbestos — short fibre caulking grade chrysotile | 13.5% |
| Disintegrated Kraft paper ⅜″ average fibre length | 3.3% |
| Linseed stand oil 350 poise at 25°C | 23.9% |
| Anti-oxidant (hydroquinone) | 0.1% |

Maximum penetration 96 units (after 50 minutes at 150°C)

EXAMPLE 15

General example:

a)
| | |
|---|---|
| Whiting | 40 – 70% |
| Precipitated chalk (type 2c) | 5 – 20% |
| Asbestos (short fibre) chrysotile | 10 – 20% |
| Asbestos (long fibre) amosite | 2.5 – 15% |
| Vehicles (types 12–15) | 20 – 30% |
| Anti-oxidant (hydroquinone) | 0.05–0.2% |

Example 15
| | |
|---|---|
| Whiting | 49.3% |
| Precipitated chalk (type 2c) | 9.9% |
| Asbestos — short fibre caulking grade chrysotile (type 1) | 13.5% |
| Asbestos — long fibre, amosite | 3.3% |
| Linseed stand oil 350 poise at 25°C | 23.9% |
| Anti-oxidant (hydroquinone) | 0.1% |

Penetration 58 units after 30 minutes at 100°C.

EXAMPLE 16

General example:
(as Example 15 but with both types of asbestos replaced by short fibre and long fibre disintegrated Kraft paper.)

| | |
|---|---|
| Whiting | 40 – 70% |
| Precipitated chalk (type 2c) | 5 – 20% |
| Disintegrated Kraft paper (−⅛″ + 1/16″) | 10 – 20% |
| Disintegrated Kraft paper (−5/16″ + ⅜″) | 2.5 – 15% |
| Vehicles types 2–15 | 20 – 30% |
| Anti-oxidant (hydroquinone) | 0.05–0.20% |

Example 16
| | |
|---|---|
| Whiting | 49.3% |
| Precipitated chalk (type 2c) | 9.9% |
| Disintegrated Kraft paper (−⅛″ + 1/16″) | 12.0% |
| Disintegrated Kraft Paper (−5/16″ + ⅜″) | 4.8% |
| Linseed stand oil 250 poise at 25°C | 23.9% |
| Anti-oxidant (hydroquinone) | 0.1% |

Penetration 56 units after 160 minutes at 100°C.

A further sealant composition of value is given in specific Example 17, which follows:

Example 17
| | |
|---|---|
| Whiting | 76.7% |
| Fiberized Kraft paper (−⅜″ BSS mesh) | 4.3% |
| Vehicle No. 1 or 5 | 19.0% |

Penetration 42 units at 18°C.

We claim as our invention:

1. A sealant composition in strip or ribbon form consisting essentially of, by weight, 40–70 percent of a finely divided particulate filler selected from the group consisting of calcium carbonate and talc, 3–25 percent of a fibrous material consisting substantially of fibres having a length in the range of 0.01 to 0.05 mm. and a diameter in the range of 180 to 400 angstroms, and 10–40 percent of a liquid vehicle being a member selected from the group consisting of non-drying alkyd resins, non-drying oils, blends of a drying oil plus adjuvants to prevent oxidation thereof and mixtures thereof, said sealant composition having a penetration of not greater than 70 penetration units at −10°C, a penetration value of not less than 35 penetration units at 30°C, a storage ability such that after three months exposure at 30°C in air at 50 percent relative humidity, the penetration is not less than 35 penetration units at −10°C, and a hardness of not greater than 120 penetration units under normal pressure but irrespective of time and temperature.

2. A sealant composition according to claim 1 wherein the fibrous material is a member selected from the group consisting of fiberized newsprint, wood fibre, carbonized rayon and carbonized Kraft paper fibres.

3. A sealant composition according to claim 1 wherein the fibrous material is a member selected from the group consisting of asbestos, fibrous asbestine talc, glass wool and slag wool.

4. A sealant according to claim 1 which, if held at a constant temperature of 150°C, will not soften to more than 65 penetration units in 5 minutes, and will thereafter rapidly and progressively harden to a hardness of less than 60 penetrometer units.

* * * * *